(12) United States Patent
Enrici

(10) Patent No.: US 12,081,636 B2
(45) Date of Patent: Sep. 3, 2024

(54) DISTRIBUTION OF MACHINE LEARNING WORKFLOWS ON WEBSCALE INFRASTRUCTURES

(71) Applicant: Nokia Solutions and Networks Oy, Espoo (FI)

(72) Inventor: Andrea Enrici, Bourg la Reine (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/239,822

(22) Filed: Apr. 26, 2021

(65) Prior Publication Data
US 2022/0345535 A1   Oct. 27, 2022

(51) Int. Cl.
*H04L 67/60*   (2022.01)
*G06F 16/901*  (2019.01)
*H04L 41/12*   (2022.01)

(52) U.S. Cl.
CPC .......... *H04L 67/60* (2022.05); *G06F 16/9024* (2019.01); *G06F 16/9027* (2019.01); *H04L 41/12* (2013.01)

(58) Field of Classification Search
CPC ..... H04L 67/60; H04L 41/12; G06F 16/9024; G06F 16/9027
See application file for complete search history.

(56) References Cited

U.S. PATENT DOCUMENTS

| | | | | |
|---|---|---|---|---|
| 6,381,739 B1* | 4/2002 | Breternitz, Jr. | ..... | G06F 11/3612 714/37 |
| 6,862,731 B1* | 3/2005 | Roth | ..... | G06F 9/5066 719/310 |
| 2007/0260668 A1* | 11/2007 | Chen | ..... | H04L 67/60 709/201 |
| 2010/0262574 A1* | 10/2010 | Zhou | ..... | G06N 5/02 707/E17.05 |
| 2012/0144376 A1* | 6/2012 | Van Eijndhoven | ..... | G06F 8/456 717/146 |
| 2012/0185867 A1* | 7/2012 | Archer | ..... | G06F 9/5066 718/105 |
| 2017/0132513 A1* | 5/2017 | Yu | ..... | G06F 9/5038 |

OTHER PUBLICATIONS

Yu et al., "Dynamic Control Flow in Large-Scale Machine Learning" EuroSys '18 Apr. 23-26, 2018, Porto, Portugal, retrieved from internet <<https://arxiv.org/pdf/1805.01772.pdf>>.

(Continued)

*Primary Examiner* — Thomas J Dailey
(74) *Attorney, Agent, or Firm* — Harness, Dickey & Pierce, P.L.C.

(57) ABSTRACT

A network device includes processing circuitry configured to cause the network device to: partition a flow graph for an application to generate a partitioned graph of nodes and edges, each of the nodes including computations mapped to an execution unit to execute at least a portion of the application, and each of the edges denoting communications between execution units; determine whether the partitioned graph is an irreducible graph; and schedule the computations and the communications for execution in response to determining that the partitioned graph is an irreducible graph.

13 Claims, 7 Drawing Sheets

(56) References Cited

OTHER PUBLICATIONS

Aho, A.V. et al., "Compilers, Principles, Techniques, and Tools," Pearson Education, 2nd edition, 2006.
K. D. Cooper et al., "Iterative data-flow analysis, revisited," Mar. 26, 2004, retrieved from internet<<http://citeseerx.ist.psu.edu/viewdoc/download?doi=10.1.1.125.1549&rep=rep1&type=pd>>.
A. C. Fong, et al., "Finding the depth of a flow grap," Journal of Computer and System Sciences 15, pp. 300-309 (1977).
Nokia, "Switch to data center networking your way; Nokia Data Center Fabric solution; #TheSwitchIson," 2020.
IBM, "cloud FPGA, IBM Research Europe Zurich," retrieved on Feb. 25, 2021 from internet <<https://www.zurich.ibm.com/cci/cloudFPGA/>>.
Huawei, "FX-Series FPGA Accelerator Cards—Huawei Enterprise", retrieved on Feb. 25, 2021 from internet <<https://e.huawei.com/en/products/servers/pcie-ssd/fpga>>.
Huawei, "FPGA Accelerated Cloud Server-Huawei Cloud," retrieved on Feb. 25, 2021 from internet <<https://www.huaweicloud.com/en-us/product/fcs.html>>.
Oracle, "FPGA Offload," retrieved on Feb. 25, 2021, from internet <<https://labs.oracle.com/pls/apex/f?p=LABS:project_details:0:128>>.

\* cited by examiner

DISTRIBUTION OF MACHINE LEARNING WORKFLOWS ON WEBSCALE INFRASTRUCTURES

BACKGROUND

Telecommunications systems, for example, may utilize Machine Learning (ML) applications or programs to process and analyze data in areas, such as customer experience, network automation, business process automation, new digital services, infrastructure maintenance, or the like.

SUMMARY

The scope of protection sought for various example embodiments of the disclosure is set out by the independent claims. The example embodiments and/or features, if any, described in this specification that do not fall under the scope of the independent claims are to be interpreted as examples useful for understanding various embodiments.

According to one or more example embodiments, partitioned graphs that are reducible and can be scheduled in a distributed fashion may be generated based on data-flow graphs, without incurring the minimum loop connectedness problem of the conventional art. In case this is not possible, an optimal scheduling for an irreducible partitioned graph may be computed so that it can be used at run-time by a central coordinator to govern the execution of the distributed machine learning (ML) application.

At least one example embodiment provides a network device comprising processing circuitry. The processing circuitry is configured to cause the network device to: partition a flow graph for an application to generate a partitioned graph of nodes and edges, each of the nodes including computations mapped to an execution unit to execute at least a portion of the application, and each of the edges denoting communications between execution units; determine whether the partitioned graph is an irreducible graph; and schedule the computations and the communications for execution in response to determining that the partitioned graph is an irreducible graph.

At least one other example embodiment provides a network device comprising: means for partitioning a flow graph for an application to generate a partitioned graph of nodes and edges, each of the nodes including computations mapped to an execution unit to execute at least a portion of the application, and each of the edges denoting communications between execution units; means for determining whether the partitioned graph is an irreducible graph; and means for scheduling the computations and the communications for execution in response to determining that the partitioned graph is an irreducible graph.

According to example embodiments, the processing circuitry may be configured to cause the network device to: determine whether the partitioned graph is a reducible graph, and output the partitioned graph and associated metadata without scheduling the computations and the communications in response determining that the partitioned graph is a reducible graph.

The processing circuitry may be configured to cause the network device to schedule the computations and the communications for execution by: computing a Depth First Search Tree based on the partitioned graph, and generating an execution order for the computations and the communications based on the Depth First Search Tree.

The processing circuitry may be configured to cause the network device to output the partitioned graph, the execution order, and associated metadata to a network orchestrator.

The processing circuitry may be configured to cause the network device to compute the Depth First Search Tree by: computing a loop connectedness for each of a plurality of candidate Depth First Search Trees, the loop connectedness being a maximum number of retreating edges in any acyclic path in the flow graph associated with the candidate Depth First Search Tree; and selecting a candidate Depth First Search Tree associated with a minimum loop connectedness, from among the plurality of candidate Depth First Search Trees, as the Depth First Search Tree.

The processing circuitry may be configured to cause the network device to: select an algorithm, from a library of graph partitioning algorithms, based on a topological property of the partitioned graph, and compute the Depth First Search Tree based on the algorithm.

The processing circuitry may be configured to cause the network device to: select a graph partitioning algorithm from a library of graph partitioning algorithms based on an objective function associated with the application, and partition the flow graph based on the graph partitioning algorithm.

At least one other example embodiment provides a method comprising: partitioning a flow graph for an application to generate a partitioned graph of nodes and edges, each of the nodes including computations mapped to an execution unit to execute at least a portion of the application, and each of the edges denoting communications between execution units; determining whether the partitioned graph is an irreducible graph; and scheduling the computations and the communications for execution in response to determining that the partitioned graph is an irreducible graph.

At least one other example embodiment provides a non-transitory computer-readable storage medium storing computer-readable instructions that, when executed by processing circuitry at a network device, cause the network device to perform a method comprising: partitioning a flow graph for an application to generate a partitioned graph of nodes and edges, each of the nodes including computations mapped to an execution unit to execute at least a portion of the application, and each of the edges denoting communications between execution units; determining whether the partitioned graph is an irreducible graph; and scheduling the computations and the communications for execution in response to determining that the partitioned graph is an irreducible graph.

According to example embodiments, the method may further include outputting the partitioned graph and associated metadata without scheduling the computations and the communications in response determining that the partitioned graph is not an irreducible graph.

The scheduling the computations and the communications for execution may include: computing a Depth First Search Tree based on the partitioned graph, and generating an execution order for the computations and the communications based on the Depth First Search Tree.

The method may further include outputting the partitioned graph, the execution order, and associated metadata to a network orchestrator.

The computing a Depth First Search Tree may include: computing a loop connectedness for each of a plurality of candidate Depth First Search Trees, the loop connectedness being a maximum number of retreating edges in any acyclic path in the flow graph associated with the candidate Depth First Search Tree; and selecting a candidate Depth First Search Tree associated with a minimum loop connectedness, from among the plurality of candidate Depth First Search Trees, as the Depth First Search Tree.

The method may further include: selecting an algorithm, from a library of graph partitioning algorithms, based on a topological property of the partitioned graph, and wherein the computing may compute the Depth First Search Tree based on the algorithm.

The method may further include: selecting a graph partitioning algorithm from a library of graph partitioning algorithms based on an objective function associated with the application; and wherein the partitioning may partition the flow graph based on the graph partitioning algorithm.

The application may be a machine learning (ML) application.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
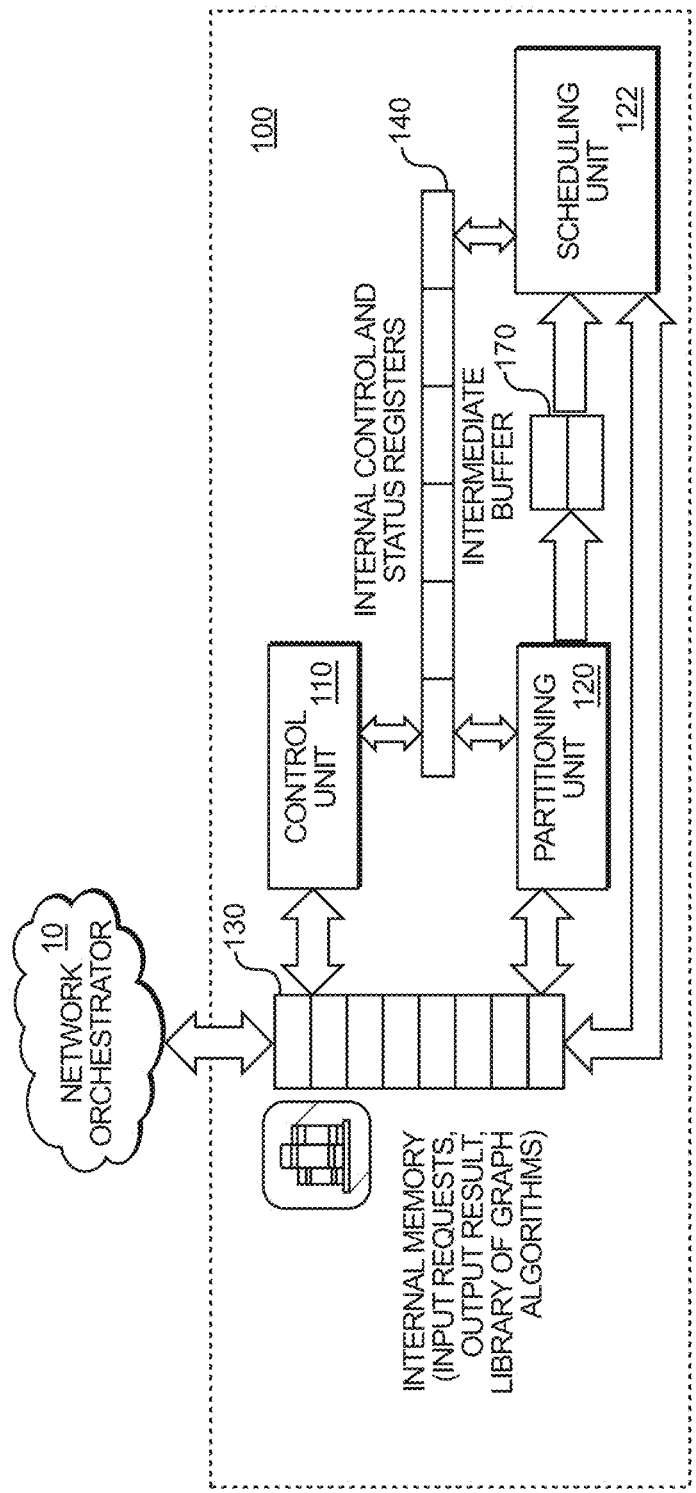
FIG. 1 is a block diagram illustrating a partition and scheduling device and a network orchestrator according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

As mentioned above, telecommunication systems, for example, may utilize Machine Learning (ML) applications or program s to process and analyze data in areas, such as customer experience, network automation, business process automation, new digital services, infrastructure maintenance, or the like. ML applications may include, for example, applications based on recurrent neural networks, applications based on deep-q networks, or the like.

Conventionally, ML applications are compiled to an intermediate representation referred to as a data-flow graph G. A data-flow graph G is a rooted, directed graph $G=<N,E,r>$, where nodes N represent computations (e.g., divide, multiply, add, etc.), edges E represent dependencies on multi-dimensional data-sets called tensors on which computations represented by the nodes N are performed, and r denotes the graph's root node, which is where the execution starts.

A data-flow graph may be partitioned (divided) into subgraphs making up a partitioned graph, and executed in distributed fashion on a collection of heterogeneous distributed devices (e.g., CPUs, GPUs, application specific integrated circuits (ASICs), field-programmable gate arrays (FPGAs), etc.) with, in some instances, a client process (central coordinator) to schedule (drive) the computations on the distributed devices.

Conventional open-source libraries for ML applications may provide support for executing distributed ML applications on large scale systems. In one conventional example, a data-flow graph may be partitioned into a partitioned graph including subgraphs run by separate devices, and each subgraph may be managed by a local executor that runs on the device's host. A central coordinator may be instantiated to centrally govern the execution of the distributed subgraphs, but this situation may be avoided to allow computations to progress independently.

In this example, subgraphs may communicate by a message-passing paradigm with send and receive primitives. These communications may be governed by the local executor's Finite State Machine (FSM) that imposes an order on the execution of send/receive primitives.

Run-time performance (e.g., time to convergence, memory footprint, etc.) of distributed ML applications may depend on how the data-flow graph G is partitioned and/or how the computations and communications within a partitioned graph are scheduled. As ML applications perform iterative computations, the run-time necessary for an application to converge depends on the scheduling of the partitioned graph for an application (e.g., the scheduling imposed by the local executor's FSM, as well as the scheduling imposed by a central coordinator, if present).

Furthermore, the topology of the partitioned graph influences the scheduling choices that are possible, and thus influences the final run-time performance of the entire application.

Some background information regarding graph topological properties relevant for scheduling and run-time performance will now be discussed.

Multiple schedulings (also referred to as an execution orders) may exist for a rooted, directed graph. But, any execution order must respect the dependency relationships given by edges E in the directed graph (e.g., an edge e from node a to node b, denotes a precedence constraint that must be executed before b).

In one example, when producing a valid scheduling, a flow graph (a directed, rooted graph where all nodes are reachable from the root node) may be visited in a Depth-First Search (DFS) to produce a DFS tree (DFST). The DFST is used to classify edges in the flow graph as tree edges and non-tree edges. A tree edge is an edge that belongs to both the flow graph and the DFST. A non-tree edge is an edge that belongs to the flow graph, but does not belong to the DFST. Each non-tree edge may be further classified as a forward edge, a retreating edge or a cross edge. A forward edge is an edge from a node to one of its descendants in the DFST. A retreating edge is an edge from a node to one of its ancestors in the DFST. A cross edge is an edge that is neither a forward edge nor a retreating edge.

In one example context, for an execution order to be optimal (scheduling of a partition that leads to relatively rapid convergence of an ML application), the scheduling is produced from the DFST having the following property:

Property 1: The maximum number of retreating edges in DFST T is minimal on all acyclic paths in the flow graph G, over all possible DFSTs of the flow graph G.

The maximum number of retreating edges in Property 1 is referred to as the loop connectedness lc(G,T) of (or in) the graph for (or associated with) the DFST. In this case, G is the flow graph and T is the DFST.

A flow graph (e.g., a partitioned graph) may be reducible or irreducible. A reducible graph is a flow graph that can be reduced to a single node according to the following two transformations:

T1: remove all self-loops (edges with identical head and tail nodes); and

T2: merge a pair of nodes (n,m) to a single node p, if and only if node m is the only predecessor of node n. As a result of this transformation, each edge n→b becomes an edge p→b. If there is an edge n→m, this edge becomes a self-loop p→p.

On the contrary, a flow graph is irreducible if after repeatedly applying transformations T1 and T2 (regardless of the order), the flow graph cannot be reduced to a single node.

For reducible flow graphs, the loop connectedness lc(G,T) does not depend on (is independent of) the DFST used to classify edges. Hence, Property 1 discussed above is irrelevant. On the contrary, for irreducible flow graphs, the loop connectedness lc(G,T) depends on the specific DFST used to classify edges. Thus, for an irreducible flow graph the DFST complying with Property 1 should be used to compute scheduling for the flow graph.

One or more example embodiments enable more efficient distribution (partition and scheduling) of ML applications (e.g., iterative ML applications or ML workflows) on large web-scale systems. As discussed herein, "efficient distribution" refers to the reduction of the time necessary for an iterative ML application to converge to a solution (or fixed point) for execution.

One or more example embodiments provide methods, devices, architectures and non-transitory computer-readable storage mediums to analyze a data-flow graph G of a ML application (e.g., an iterative ML application); partition the data-flow graph G into a partitioned graph G' that is assigned to distributed execution units; and in case of an irreducible subgraph, for example, compute a scheduling for the communications in the partitioned graph G' that reduces the number of iterations necessary for convergence of the ML application. The computation of the scheduling may be performed for each irreducible partitioned graph G' generated from the partitioning.

FIG. 1 is a block diagram illustrating a logical configuration of a partition and scheduling device 100 (e.g., at a network device) and network orchestrator according to example embodiments.

Referring to FIG. 1, the partition and scheduling device 100 includes a controller (also referred to as a control unit or control circuitry) 110, a partitioning unit or circuitry (PU) 120, a scheduling unit or circuitry (SU) 122, an internal memory 130, internal control and status registers 140 and an intermediate buffer 170. The partition and scheduling device 100 may be in two-way communication with the network orchestrator 10.

The controller 110, the partitioning unit 120 and the scheduling unit 122 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. Further, the controller 110, the partitioning unit 120 and the scheduling unit 122 may be embodied as individual components, or may be included in a combined component including the controller 110, the partitioning unit 120 and the scheduling unit 122. The partition and scheduling device 100 may be implemented on, or as, a network device, such as a server or other cloud-based network device.

The controller 110 may be configured to communicate with the network orchestrator 10, and to manage and/or control the memory 130, the internal control and status registers 140, a library of graph algorithms, the partitioning unit 120 (trigger/stop) and the scheduling unit 122 (trigger/stop). Example functionality of the controller 110 will be discussed in more detail later.

The partitioning unit 120 is configured to receive a data-flow graph G for a ML application and produce at least one partitioned graph G', whose nodes (ML computations) are mapped onto a set of distributed execution units (e.g., CPUs, FPGAs, GPUs, etc.). Example functionality of the partitioning unit 120 will be discussed in more detail later.

The intermediate buffer 170 is configured to exchange data structures to process. For example, the intermediate buffer 170 may buffer the partitioned graph(s) G' and/or mapping of nodes onto sets of distributed execution units from the partitioning unit 120 for input to the scheduling unit 122.

For an irreducible partitioned graph G', the scheduling unit 122 is configured to generate a schedule for the distributed computations based on the partitioned graph G' produced by the partitioning unit 120 and buffered by the intermediate buffer 170. Example functionality of the scheduling unit 122 will be discussed in more detail later.

The network orchestrator 10 may be configured to deploy requests for scheduling ML applications to the partition and scheduling device 100, and to implement the scheduling computed by the partition and scheduling device 100. The network orchestrator 10 may also be configured to deploy requests for updating the library of graph algorithms. Requests issued by the network orchestrator 10 will be discussed in more detail later.

The internal control and status registers 140 may be designed to store control information to be exchanged among the controller 110, the partitioning unit 120 and the scheduling unit 122. In a more specific example, the internal control and status registers 140 may be a memory or portion thereof programmed with a code indicating a particular status of the partitioning unit 120 and the scheduling unit 122 (e.g., 'busy', 'idle' or 'ready', etc.). In one example, the internal control and status registers 140 may include separate status registers for each of the partitioning unit 120 and the scheduling unit 122.

The memory 130 may be a computer readable storage medium that generally includes a random access memory (RAM), read only memory (ROM), and/or a permanent mass storage device, such as a disk or flash drive. In an example in which the partition and scheduling device 100, or an element thereof, is implemented on one or more processors, the memory 130 may also store an operating system and any other routines/modules/applications for providing the functionalities of the partition and scheduling device 100, or element thereof, to be executed by the one or more processors. These software components may also be loaded from a separate computer readable storage medium into the memory 130 using a drive mechanism (not shown). Such separate computer readable storage medium may include a disc, tape, DVD/CD-ROM drive, memory card, or other like computer readable storage medium (not shown).

The memory 130 may further include communication buffers, input and output buffers, the library of graph algorithms, look-up tables (LUTs), hash and other tables, etc. The communication buffers may store input and/or output requests between the partition and scheduling device 100 and the network orchestrator 10. The library of graph algorithms is a library of graph processing algorithms to be used by the partition and scheduling device 100. Although shown in FIG. 1 as part of the internal memory 130, the library of algorithms may be stored in a separate memory (either internal or external).

Figure 2:
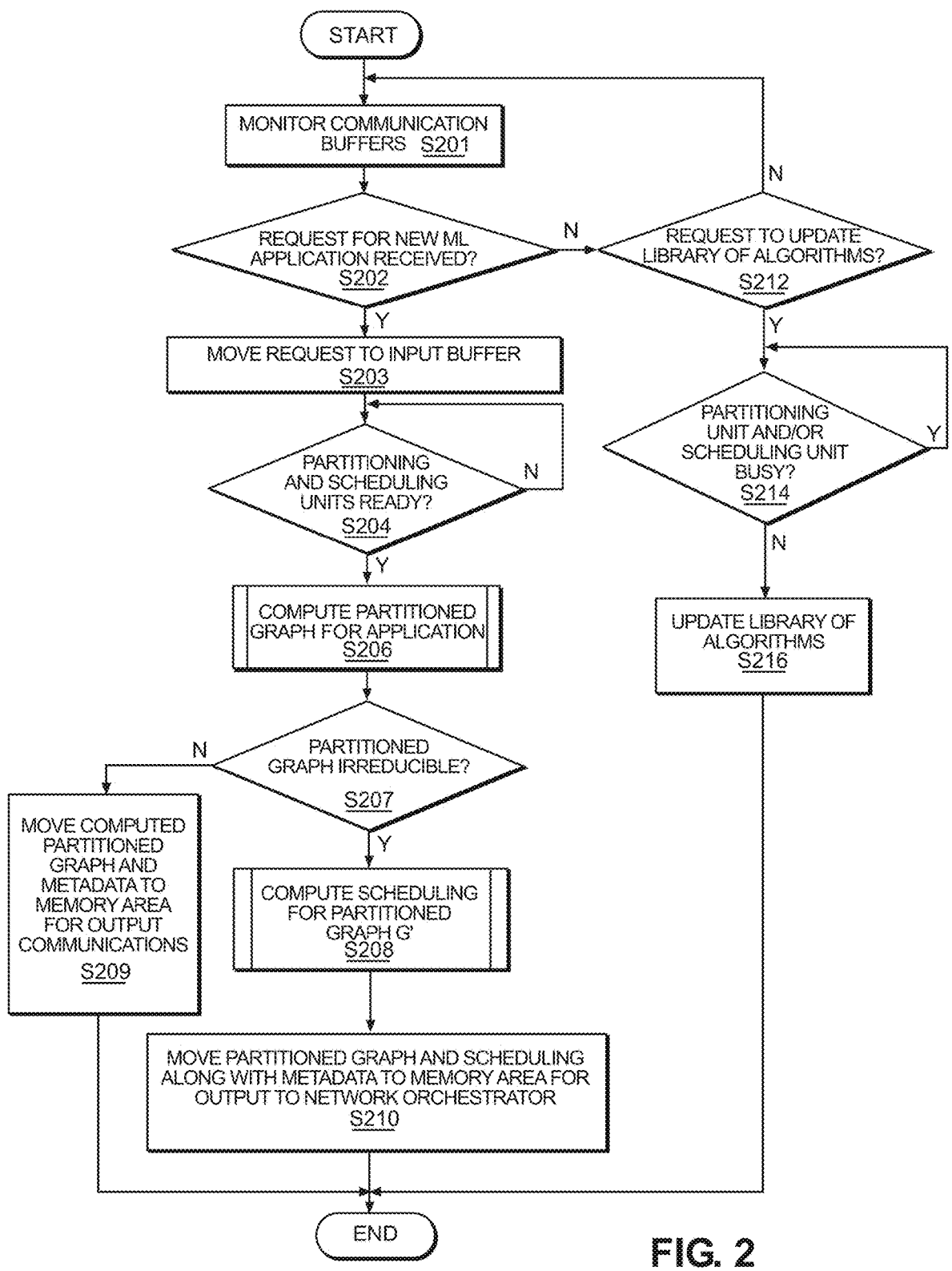
FIG. 2 is a flow chart illustrating a method according to example embodiments.

FIG. 2 is a flow chart illustrating a method of operation of the controller 110 according to example embodiments.

Referring to FIG. 2, at step S201, the controller 110 monitors the communication buffers (in the memory 130) for new requests from the network orchestrator 10. In one example, the request may be a request for a new ML application or a request to update the library of graph algorithms. The network orchestrator 10 may send a request to the partition and scheduling device 100 by storing the request in the communication buffers (e.g., input communication buffer) in the memory 130.

A request for a new ML application from the network orchestrator 10 may include an identifier for the ML application (ML application ID), the data-flow graph G for the ML application, an architecture graph D (whose nodes are execution units and edges are logical communication links) and/or an objective function $f$.

The objective function $f$ may be encoded in a string of characters that may be used by the controller 110 as a key to access a LUT (e.g., in the memory 130). The LUT associates graph algorithms in the library of graph algorithms with objective functions, such as objective function $f$. For example, 0x00A may be a key referring to the objective function $f$="Minimize latency". The controller 110 may use this key to access the 10th entry in the LUT that contains the address (e.g., in memory 130) of an algorithm that is configured to partition (specialized in partitioning) the data-flow graph G to minimize the latency of the requested ML application. Other objective functions may include "Minimize power consumption", "Maximize throughput", etc. The association between graph algorithms and objective functions is done according to known characteristics of the algorithms (e.g., run-time, memory footprint, quality of output results, or the like), and the association may be performed and/or provided by the network orchestrator 10.

The architecture graph D may be annotated with the current resources available at the execution nodes and communication links. For example, nodes may be annotated with the available capacity in terms of CPU computational power, available memory, etc. Communication links may be annotated with the available bandwidth, available space in intermediate buffers, etc. The available resources are the result of placement decisions when serving previous requests. After serving a request, the network orchestrator 10 updates the architecture graph D for later use.

Although example embodiments are described with regard to the architecture graph D being provided as part of the request from the network orchestrator 10, example embodiments should not be limited thereto. Rather, according to one or more example embodiments, the architecture graph D may be stored locally within the partition and scheduling device 100 (e.g., in the internal memory 130) and may be updated automatically upon completion of processing of a request.

Returning to FIG. 2, in response to the (new) request from the network orchestrator 10, at step S202 the controller 110 determines whether the request is for a new ML application. In at least one example embodiment, the controller 110 determines that the request is for a new ML application if the request includes a ML application ID.

If the controller 110 determines that the request is for a new ML application, then at step S203 the controller 110 moves the request from the communication buffers to, for example, an input buffer portion of the internal memory 130.

At step S204, the controller 110 reads the respective status registers 140 of the partitioning unit 120 and the scheduling unit 122 to determine whether the units are currently processing pending requests. In this example, if the partitioning unit 120 or the scheduling unit 122 is currently processing a pending request, then the respective status register associated with the unit will read 'busy'.

If one or more of the partitioning unit 120 and the scheduling unit 122 are currently processing a pending request ('busy'), then the controller 110 continues to periodically check the status registers 140 to determine when the partitioning unit 120 and the scheduling unit 122 are ready to process the new request (e.g., the status registers 140 read 'idle' or 'ready').

Still referring to step S204, once having determined that the partitioning unit 120 and the scheduling unit 122 are ready to process the new request, at step S206 the partitioning unit 120 computes a partitioned graph G' for the ML application identified in the request. In one example, the controller 110 may instruct the partitioning unit 120 to compute a partitioned graph G' for the new ML application. The partitioning unit 120 may compute the partitioned graph G' for the new ML application by transforming the data-flow graph G received in the request from the network controller 10 into the partitioned graph G' including computations assigned to distributed execution units.

According to one or more example embodiments, the partitioning unit 120 (and later the scheduling unit 122 as needed) may identify the ML application as the application to process by accessing a table in memory (e.g., memory 130), where the controller 110 stores the current status of the system and information related to retrieving data structures of the ML application (e.g., the data-flow graph G, the partitioned graph G', etc.).

An example embodiment of step S206 in FIG. 2 will now be discussed in more detail below with regard to FIG. 3.

Figure 3:
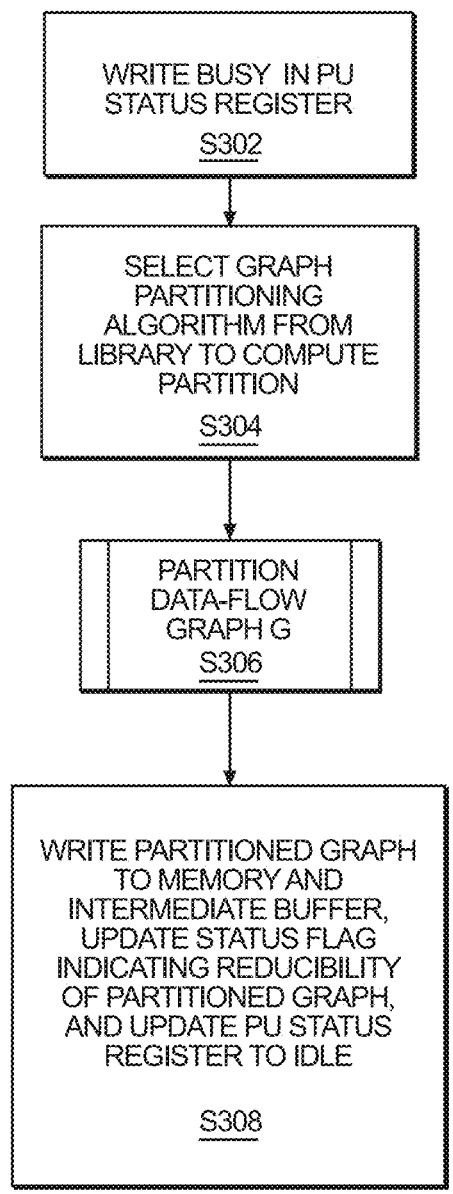
FIG. 3 is a flow chart illustrating another method according to example embodiments.

FIG. 3 is a flow chart illustrating a method for computing a partitioned graph G' for a ML application at the partitioning unit 120 according to example embodiments.

Referring to FIG. 3, upon identifying the ML application to be processed, at step S302 the partitioning unit 120 writes 'busy' to the status register 140 for the partitioning unit to indicate that the partitioning unit 120 is currently processing the request for the ML application.

At step S304, the partitioning unit 120 selects a graph partitioning algorithm from the library of graph algorithms to compute the partitioned graph G' of the ML application. As discussed above, the partitioning unit 120 may select the graph partitioning algorithm by accessing a LUT based on the objective function $f$ included in the request from the network orchestrator 10.

At step S306, the partitioning unit 120 partitions the data-flow graph G for the ML application into sets of nodes and edges that constitute a partitioned graph G', where nodes are subgraphs of the data-flow graph G (computations mapped to a given execution unit) and edges denote communications (send/receive primitives) between the execution units. The partitioning attempts to match the objective function $f$ included in the request and to create a partitioned graph G' that is reducible. If a reducible partitioned graph is not possible (the condition is not satisfied, and the partitioned graph G' is irreducible), then the partitioning unit 120 may attempt to generate a reducible graph by selecting a different algorithm from the library of graph algorithms and repeating the partitioning process iteratively, up to a threshold number of iterations. The threshold number of iterations may be provided by the network orchestrator 10 as part of the request or the threshold may be associated with the algorithm itself based on the known average runtime for the algorithm. For relatively slow algorithms, the threshold number of iterations may be relatively small (e.g., 3, 4, 5), whereas for relatively fast algorithms the threshold may be higher (e.g., 10 or more). An example embodiment of step S306 will be described in more detail below with regard to FIG. 4.

Once the partitioned graph G' is computed, at step S308 the partitioning unit 120 writes the partitioned graph G' to the memory 130 and to the intermediate buffer 170. Also at step S308, the partitioning unit 120 sets a status flag indicating whether the partitioned graph G' is reducible or irreducible, and updates the status register 140 for the partitioning unit 120 to 'idle' or 'ready'. The status flag may be stored in the status register 140 or, alternatively, in the intermediate buffer 170.

The idea behind the constraint that the partitioned graph G' be reducible is that scheduling its computations and communications does not depend on (is independent of) the minimum loop connectedness problem (Property 1 noted above). Hence, scheduling may be performed by the local executors at the devices without the need for a central coordinator. In case the partitioned graph G' is irreducible, however, the scheduling unit 122 is utilized to compute a scheduling for the distributed computations. The scheduling computed by the scheduling unit 122 may be used by the central coordinator to govern the execution of the requested ML application, at run-time.

Figure 4:
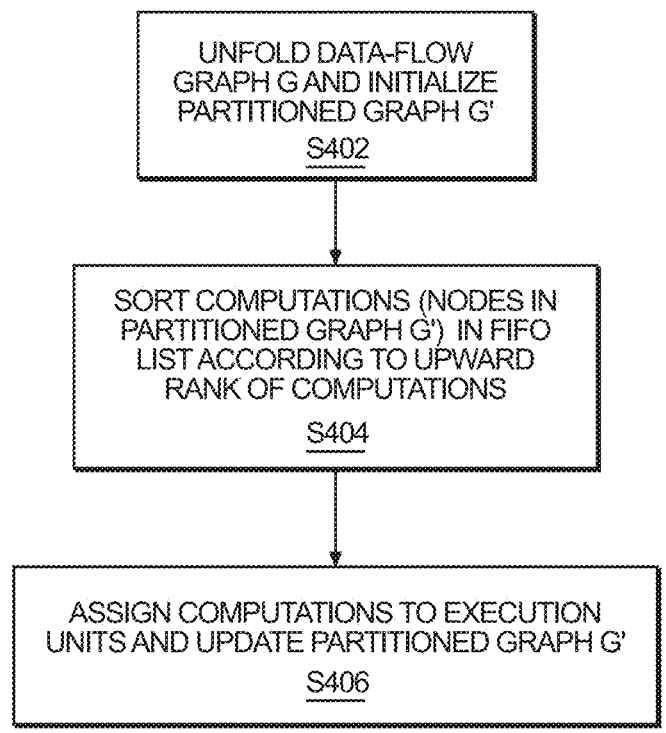
FIG. 4 is a flow chart illustrating yet another method according to example embodiments.

FIG. 4 is a flow chart illustrating a method for transforming the data-flow graph G into the partitioned graph G' according to example embodiments. The method shown in FIG. 4 is a greedy algorithm for transformation with the objective function "Minimize latency" (application completion time). However, example embodiments should not be limited to this example. It is noted that the computations that are partitioned are the branches of conditional statements and bodies of loops in the data-flow graph G.

Referring to FIG. 4, at step S402, the partitioning unit 120 unfolds the data-flow graph G by instantiating new nodes and edges for branches and bodies of loops that can be partitioned. The partitioned graph G' is initialized as the unfolded version of the data-flow graph G.

At step S404, the partitioning unit 120 sorts computations (nodes in the initialized partitioned graph G') in a first-in-first-out (FIFO) list according to the upward rank of the computations. In one example, the upward rank for an $i^{th}$ node may be given according to Equation (1) shown below.

$$\text{rank}(i) = w_i + \max\{c_{ij} + \text{rank}(j)\}_{\text{for all immediate successors } j \text{ of } i \text{ in } G'} \quad (1)$$

In Equation (1), the successors of node i are intended as the immediate successors j of the node, $c_{ij}$ is the average communication cost (e.g., network bandwidth) of the edge between nodes i and j, and $w_i$ is the average computation cost (e.g., processing power, memory footprint, or the like) of the node in the partitioned graph G'. The rank is computed recursively by traversing the partitioned graph G' upward, starting from the exit node m whose rank is equal to $w_m$. The communication cost $c_{ij}$ is annotated in the input data-flow graph G as the cost to communicate information between nodes i and j.

Still referring to FIG. 4, at step S406 the partitioning unit 120 assigns computations to execution units and updates the partitioned graph G' accordingly. Once having assigned the computations, the updated partitioned graph G' is the partitioned graph G' written to the memory 130 and the intermediate buffer 170.

In more detail, at step S406 the partitioning unit 120 traverses the FIFO list according to the upward rankings, and assigns computations, one by one, to the most performant execution units first, until the processing power of an execution unit (candidate execution unit) is saturated. In so doing, the partitioning unit 120 attempts to assign pairs of communicating computations to identical execution units. Each time a computation is assigned to an execution unit, the partitioning unit 120 updates the partitioned graph G' according to the following algorithm:

for any pair of nodes a and b in the partitioned graph G', where node a is the only predecessor of node b and both node a and node b are assigned to the same execution unit, merge node a and node b into a single node c.

The algorithm noted above is transformation T2 discussed above, wherein nodes a and b have the additional property that they are assigned to the same execution unit.

Returning to FIG. 2, after the partitioned graph G' is computed, at step S207 the controller 110 checks the status flag to determine whether the partitioned graph G' is irreducible.

If the partitioned graph G' is irreducible, then at step S208 the scheduling unit 122 computes a scheduling for the computations and communications in the partitioned graph G' that reduces the number of iterations necessary for convergence of the ML application. That is, for example, the scheduling unit 122 computes a scheduling for the computations and communications that reduces the back-propagation of information between nodes in the partitioned graph G' (minimum loop connectedness problem discussed in Property 1). In one example, the controller 110 may instruct the scheduling unit 122 to compute the scheduling, and the scheduling unit 122 may compute the scheduling in response to the instruction from the controller 110. An example embodiment of step S208 will now be described with regard to FIGS. 5 and 6.

Figure 5:
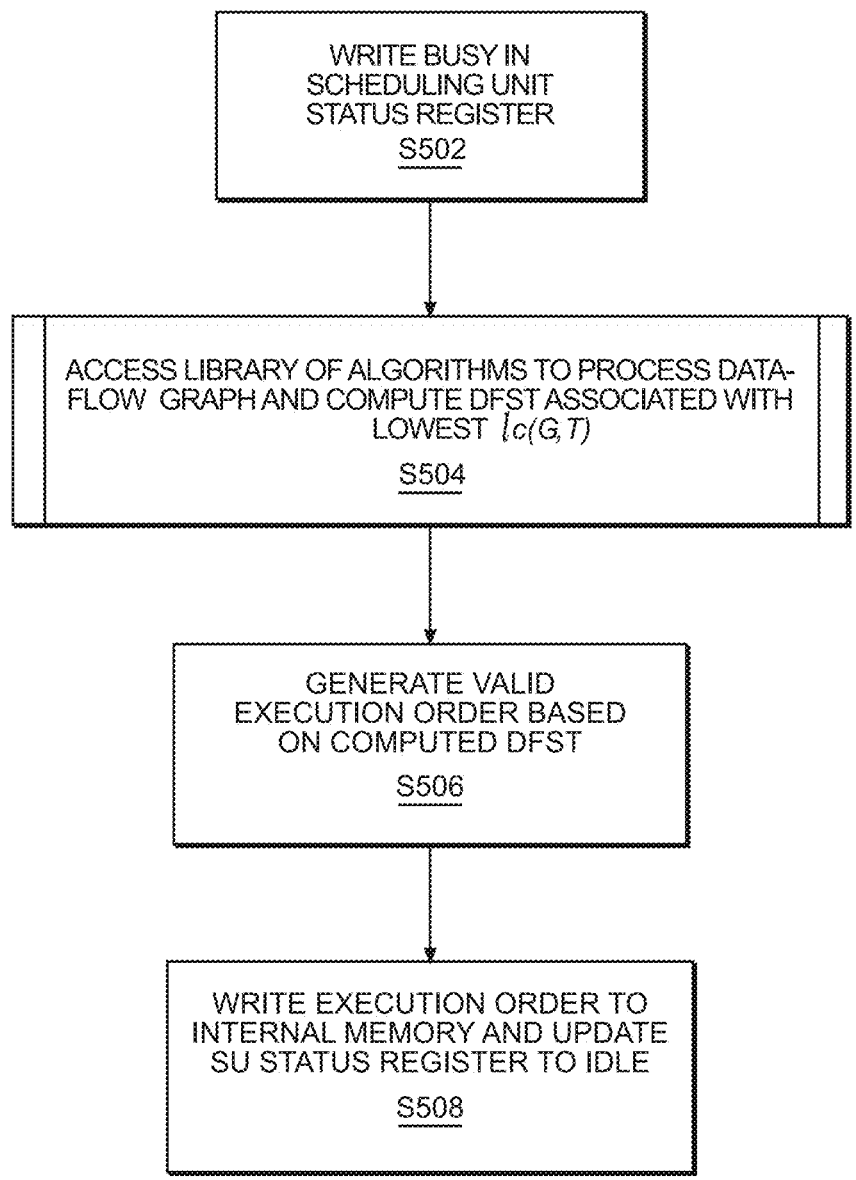
FIG. 5 is a flow chart illustrating yet another method according to example embodiments.

FIG. 5 is a flow chart illustrating a method for computing a scheduling of the partitioned graph G' according to example embodiments.

Referring to FIG. 5, at step S502 the scheduling unit 122 writes 'busy' to the status register 140 for the scheduling unit to indicate that the scheduling unit 122 is currently processing the partitioned graph G' for a requested ML application.

At step S504, the scheduling unit 122 accesses the library of graph algorithms to process the partitioned graph G' and compute the DFST T associated with the lowest (minimum) number of retreating edges (loop connectedness) lc(G',T), wherein the loop connectedness is a maximum number of retreating edges in any acyclic path in the graph associated with a DFST.

While the partitioning unit 120 selects an algorithm from the library of graph algorithms based on an objective function, the scheduling unit 122 selects an algorithm to solve the minimum loop connectedness problem based on the size or other topological property (e.g., tree-width of the graph) of the irreducible, partitioned graph G'. For larger graphs (e.g., the number of nodes and edges in the partitioned graph G' is about 10 times larger than in the input data-flow graph G), faster algorithms such as heuristics may be used. For smaller graphs, however, (e.g., partitioned graph G' is about twice the size of the data-flow graph G), slower algorithms, such as that discussed below with regard to FIG. 6, may be used.

The scheduling unit 122 may select the algorithm from the library of graph algorithms using, for example, a hash table or LUT (e.g., in the memory 130) accessed by keys in the form <number of nodes in partitioned graph G', number of edges in partitioned graph G'>.

Once having computed the DFST associated with the lowest loop connectedness lc(G',T), at step S506 the scheduling unit 122 generates a valid execution order (e.g., reverse post-order) based on the DFST computed at step S504, to be used by the central coordinator at run-time. The scheduling unit 122 may define the valid execution order by the visitation order of nodes when generating a DFST. In one example, the visitation order referred to as "reverse post-order" may be used.

At step S508, the scheduling unit 122 writes the valid execution order to internal memory (e.g., memory 130) and updates the status register for the scheduling unit 122 (e.g., to 'idle' or 'ready') to notify the controller 110 that the processing of the ML application is completed.

Figure 6:
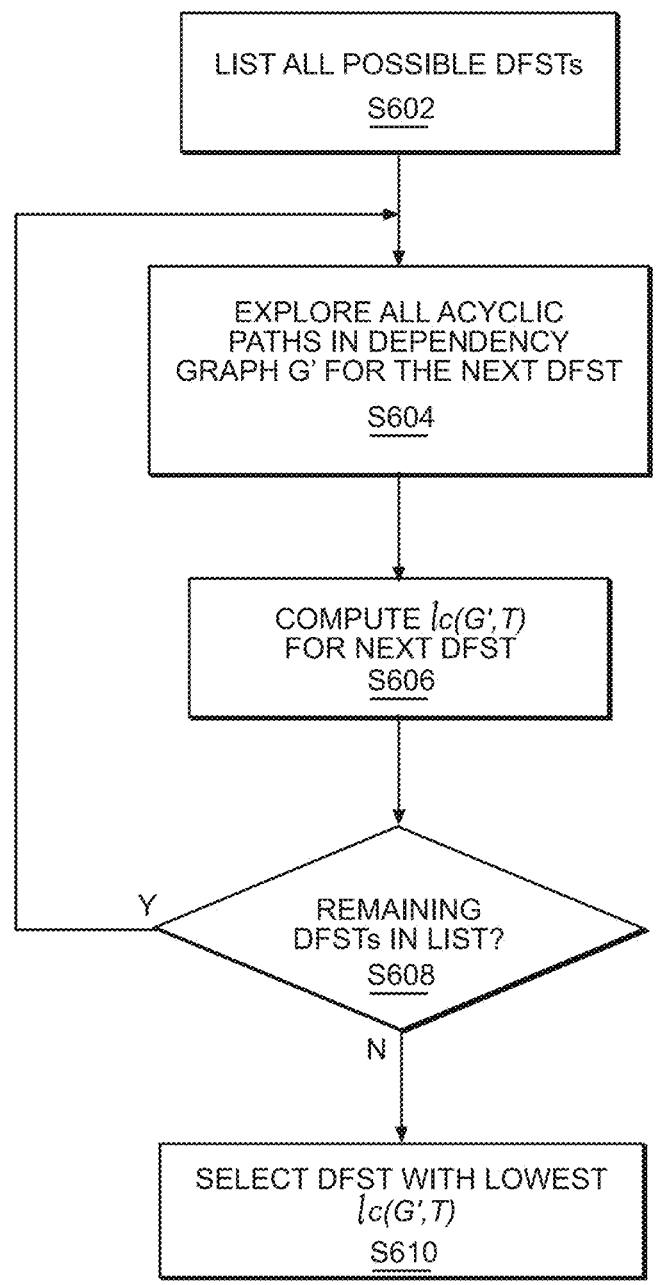
FIG. 6 is a flow chart illustrating yet another method according to example embodiments.

FIG. 6 is a flow chart illustrating a method for computing a DFST associated with a lowest maximum number of retreating edges, according to example embodiments.

Referring to FIG. 6, at step S602 the scheduling unit 122 lists all possible DFSTs of the partitioned graph G'. In one example, the scheduling unit 122 generates a list of all possible DFSTs by producing a first (or preliminary) DFST of the partitioned graph G', and then generating all spanning trees of the first DFST by performing all possible exchanges of edges of the first DFST. Possible DFSTs may also be referred to as candidate DFSTs. The scheduling unit 122 then filters out those spanning trees that are not DFSTs by verifying order relations on cross edges of the partitioned graph G' to obtain the list of all possible DFSTs. Each cross edge of a partitioned graph G' that has been visited in a DFS expresses a partial order relation concerning the DFS visitation order of nodes in the DFST for the partitioned graph G'. A cross edge from node a to node b means that the DFS algorithm visited b before a. To verify order relations, the scheduling unit 122 verifies that all cross edges' relations correspond to a valid total order relation. For instance, a DFS visitation of partitioned graph G' cannot produce the cross edges (a,b) and (b,a) as this does not correspond to a valid DFS visitation order.

At step S604, the scheduling unit 122 explores all acyclic paths in the partitioned graph G' for the next (e.g., first) DFST in the list of all possible DFSTs.

At step S606, the scheduling unit 122 computes the loop connectedness lc(G',T), which is the maximum number of retreating edges in any acyclic path in the partitioned graph G' associated with the DFST T. Also at step S606, the scheduling unit 122 may store the computed loop connectedness lc(G',T) in association with the DFST T in memory (e.g., memory 130).

After computing and storing the loop connectedness lc(G', T), at step S608 the scheduling unit 122 determines whether there are remaining DFSTs in the list of all possible DFSTs.

If there are remaining DFSTs in the list of all possible DFSTs, then the process returns to step S604 and continues as discussed herein for the next DFST in the list.

Returning to step S608, if there are no remaining DFSTs to be processed in the list of all possible DFSTs, then at step S610 the scheduling unit 122 selects the DFST associated with the lowest (minimum) loop connectedness lc(G',T). According to example embodiments, multiple DFSTs may be associated with the same lowest loop connectedness lc(G',T). In this case, the scheduling unit 122 may randomly select one of the DFSTs associated with the lowest loop connectedness lc(G',T).

Returning again to FIG. 2, after the processing at the scheduling unit 122 is complete, the processing of the pending request for the ML application is complete. As such, at step S210, the controller 110 moves the resulting partitioned graph G', scheduling and metadata (e.g., non-functional parameters such as the ML application ID, the objective function, etc.) to the area of the memory 130 reserved to output communications (communications buffers), and notifies the network orchestrator 10. The network orchestrator 10 may then directly fetch the stored result by properly addressing the internal memory 130. The network orchestrator 10 may then implement the partitioned graph G' and scheduling as needed to execute the ML application.

Returning to step S207 in FIG. 2, as mentioned above, if the partitioned graph G' is reducible then the scheduling may be performed by the local executors at the devices without the need for a central coordinator. Thus, the scheduling unit 122 need not compute a scheduling for the reducible partitioned graph G'. Consequently, if the partitioned graph G' computed by the partitioning unit 120 is reducible, then at step S209 the controller 110 moves the resulting partitioned graph G' and its metadata to the area of the memory 130 reserved to output communications and notifies the network orchestrator 10. As discussed above with regard to step S210, the network orchestrator 10 may directly fetch the results by properly addressing the internal memory 130. The network orchestrator 10 may then implement the partitioned graph G' as needed to execute the ML application.

Returning now to step S202 in FIG. 2, if the controller 110 determines that the request is not for a new ML application, then at step S212 the controller 110 determines whether the request is a request to update the library of graph algorithms at the memory 130.

If the request is not a request to update the library of graph algorithms, then the process returns to step S201 and continues to monitor the communication buffers for further requests.

Returning to step S212, if the request is a request to update the library of graph algorithms, then at step S214 the controller 110 checks the status registers 140 of the partitioning unit 120 and the scheduling unit 122 to determine whether one or more of the partitioning unit 120 and the scheduling unit 122 is currently 'busy.'

If at least the partitioning unit 120 or the scheduling unit 122 is busy, then the controller 110 waits for both of the units to be 'idle' or 'ready' (current processing has terminated or completed).

Once both the partitioning unit 120 and the scheduling unit 122 are 'idle' or 'ready', at step S216 the controller 110 updates the library of graph algorithms according to the request. The controller 110 may update the library of graph algorithms in a similar manner to a standard software update process (e.g., on a standard desktop PC) by, for example, installing executable code for new algorithms in the memory 130. The update process may modify not only the memory area where the library of graph algorithms is stored, but also update any internal data structures (e.g., LUTs) used to manage the library of graph algorithms. During the update of the library of graph algorithms, the controller 110 does not trigger any new operations on the partitioning unit 120 or the scheduling unit 122.

Example embodiments are described herein with regard to a single partitioned graph G' computed based on the data-flow graph G. However, example embodiments should not be limited to this example. In other example embodiments, a data-flow graph G may be partitioned in multiple candidate partitioned graphs G'1, G'2, . . . , G'N. In this case, the scheduling unit 122 may individually process each partitioned graph to produce corresponding schedules S1, S2, . . . , SN. This scenario may be applicable when the objective function included in the request from the network orchestrator 10 may be decomposed into at least two individual objective functions (f1, f2, . . . , fM, M≥N). In this case, the partitioning phase is evaluated against a subset of the objective functions (e.g., f1 and f2) and the remaining functions (say f3, f4, . . . , fM) are used to evaluate the performance of the scheduling solutions to select a final output pair (partitioned graph G'X and scheduling SX). An example of a composite objective function is one that is associated with two objectives (e.g., jointly minimizes latency (f1) and power consumption (f2)).

Although example embodiments are described herein with regard to data-flow graphs, example embodiments should not be limited to these examples. Rather, example embodiments may apply to other "types" of flow graphs, such as control-flow graphs. Control-flow graphs differ from data-flow graphs in the semantics associated with the edges (e.g., control relations in a control-flow graph versus data relations in a data-flow graph).

For example purposes, a single iteration of the method shown in FIG. 2 is illustrated. However, it should be understood that this method may be performed iteratively to serve any number of requests. Accordingly, the process may return to "START" (or S201) once having reached "END" (after S209, S210 or S216).

Figure 7:
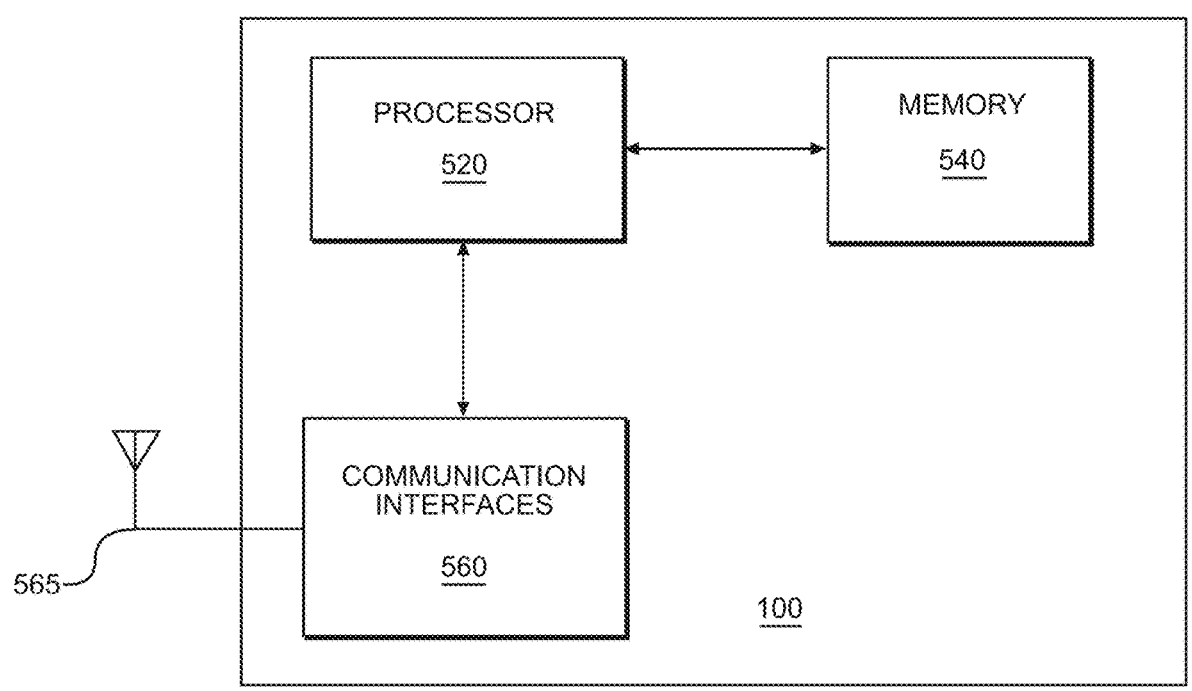
FIG. 7 is a block diagram illustrating a partition and scheduling device according to example embodiments.

FIG. 7 illustrates an example embodiment of a network device on which the partition and scheduling device 100 shown in FIG. 1 may be implemented. Although a network device is discussed, the structure shown in FIG. 7 may also serve as the partition and scheduling device 100 itself or one or more of the individual elements of the partition and scheduling device 100 (e.g., the controller 110, the partitioning unit 120, the scheduling unit 122, etc.).

As shown, the network device 100 includes: a memory 540; a processor 520 connected to the memory 540; various interfaces 560 connected to the processor 520; and one or more antennas or antenna panels 565 connected to the various interfaces 560. The various interfaces 560 and/or the antenna 565 may constitute a transceiver for transmitting/receiving data from/to other network nodes and/or LANs via a wired or wireless links. As will be appreciated, depending on the implementation of the network device 100, the network device 100 may include many more components than those shown in FIG. 7. However, it is not necessary that all of these generally conventional components be shown in order to disclose the illustrative example embodiment.

The memory 540 may be a computer readable storage medium that generally includes a random access memory (RAM), read only memory (ROM), and/or a permanent mass storage device, such as a disk drive. The memory 540 also stores an operating system and any other routines/modules/applications for providing the functionalities of the network device 100 to be executed by the processor 520. These software components may also be loaded from a separate computer readable storage medium into the memory 540 using a drive mechanism (not shown). Such separate computer readable storage medium may include a disc, tape, DVD/CD-ROM drive, memory card, or other like computer readable storage medium (not shown). In some example embodiments, software components may be loaded into the memory 540 via one of the various interfaces 560, rather than via a computer readable storage medium.

The processor 520 may be configured to carry out instructions of a computer program by performing the arithmetical, logical, and input/output operations of the system. Instructions may be provided to the processor 520 by the memory 540.

The various interfaces 560 may include components that interface the processor 520 with the antenna 565, or other input/output components. As will be understood, the various interfaces 560 and programs stored in the memory 540 to set forth the special purpose functionalities of the network device 100 will vary depending on the implementation of the network device 100. The interfaces 560 may also include one or more user input devices (e.g., a keyboard, a keypad, a mouse, or the like) and user output devices (e.g., a display, a speaker, or the like).

In practice, according to example embodiments, as irreducible cyclic communications are present between ML application partitions, there exist multiple DFSTs that correspond to different loop connectedness (see Property 1 discussed above). Example embodiments may provide a performance gain that is proportional (e.g., directly proportional) to loop connectedness lc(G,T), in that the lower loop connectedness lc(G,T), the better the performance. In a worst case, not selecting the optimal DFST may result in using a default DFST having a loop connectedness lc(G,T) of n−1, where n is the number of nodes in the data-flow graph G. The optimal loop connectedness lc(G,T) (e.g., the lowest loop connectedness lc(G,T)) instead, on average, may be around n/2. Thus, the performance gain according to example embodiments may be up to about 50% that of a default non-optimized scheduler.

Example embodiments may be embodied on any computational unit. For example, example embodiments may be used to compute partitions and scheduling for CPU-based servers as well as servers with accelerators such as FPGAs and GPUs.

Implementations of example embodiments on FPGAs may be of interest because this implementation may allow faster computations (directly in hardware) and determinism. Here, the example embodiments may execute directly in hardware without sources of non-determinism (e.g., caches, interrupts, etc.). Hence, the latency necessary to compute a joint partition-scheduling may be fully deterministic.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network apparatuses, elements or entities including cloud-based data centers, computers, cloud-based servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network apparatus, network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, network apparatuses, elements or entities including cloud-based data centers, computers, cloud-based servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A network device comprising:
   processing circuitry configured to cause the network device to
      partition a flow graph for an application to generate a partitioned graph of nodes and edges, each of the nodes including computations mapped to an execution unit to execute at least a portion of the application, and each of the edges denoting communications between execution units,
      determine whether the partitioned graph is an irreducible graph by determining whether the partitioned graph can be reduced to a single node, and
      schedule the computations and the communications for execution, in response to determining that the partitioned graph is an irreducible graph, by computing a Depth First Search Tree based on the partitioned graph and generating an execution order for the computations and the communications based on the Depth First Search Tree, wherein
         the computing the Depth First Search Tree includes
            computing a loop connectedness for each of a plurality of candidate Depth First Search Trees, the loop connectedness being a maximum number of retreating edges in any acyclic path in the flow graph associated with the candidate Depth First Search Tree, and
            selecting a candidate Depth First Search Tree associated with a minimum loop connectedness, from among the plurality of candidate Depth First Search Trees, as the Depth First Search Tree.

2. The network device of claim 1, wherein the processing circuitry is configured to cause the network device to
   determine whether the partitioned graph is a reducible graph, and
   output the partitioned graph and associated metadata without scheduling the computations and the communications in response determining that the partitioned graph is a reducible graph.

3. The network device of claim 1, wherein the processing circuitry is configured to cause the network device to output the partitioned graph, the execution order, and associated metadata to a network orchestrator.

4. The network device of claim 1, wherein the processing circuitry is configured to cause the network device to
   select a graph partitioning algorithm from a library of graph partitioning algorithms based on an objective function associated with the application, and
   partition the flow graph based on the graph partitioning algorithm.

5. The network device of claim 1, wherein the application is a machine learning application.

6. A method comprising:
   partitioning a flow graph for an application to generate a partitioned graph of nodes and edges, each of the nodes including computations mapped to an execution unit to execute at least a portion of the application, and each of the edges denoting communications between execution units;
   determining whether the partitioned graph is an irreducible graph by determining whether the partitioned graph can be reduced to a single node; and
   scheduling the computations and the communications for execution, in response to determining that the partitioned graph is an irreducible graph, by computing a Depth First Search Tree based on the partitioned graph and generating an execution order for the computations and the communications based on the Depth First Search Tree,
   wherein the computing the Depth First Search tree includes
      computing a loop connectedness for each of a plurality of candidate Depth First Search Trees, the loop connectedness being a maximum number of retreating edges in any acyclic path in the flow graph associated with the candidate Depth First Search Tree, and
      selecting a candidate Depth First Search Tree associated with a minimum loop connectedness, from among the plurality of candidate Depth First Search Trees, as the Depth First Search Tree.

7. The method of claim 6, further comprising:
outputting the partitioned graph and associated metadata without scheduling the computations and the communications in response determining that the partitioned graph is not an irreducible graph.

8. The method of claim 6, further comprising:
outputting the partitioned graph, the execution order, and associated metadata to a network orchestrator.

9. The method of claim 6, further comprising:
selecting a graph partitioning algorithm from a library of graph partitioning algorithms based on an objective function associated with the application; and wherein the partitioning partitions the flow graph based on the graph partitioning algorithm.

10. The method of claim 6, wherein the application is a machine learning application.

11. A non-transitory computer-readable storage medium storing computer-readable instructions that, when executed by processing circuitry at a network device, cause the network device to perform a method comprising:
partitioning a flow graph for an application to generate a partitioned graph of nodes and edges, each of the nodes including computations mapped to an execution unit to execute at least a portion of the application, and each of the edges denoting communications between execution units;
determining whether the partitioned graph is an irreducible graph by determining whether the partitioned graph can be reduced to a single node; and
scheduling the computations and the communications for execution, in response to determining that the partitioned graph is an irreducible graph, by computing a Depth First Search Tree based on the partitioned graph and generating an execution order for the computations and the communications based on the Depth First Search Tree,
wherein the computing the Depth First Search tree includes
computing a loop connectedness for each of a plurality of candidate Depth First Search Trees, the loop connectedness being a maximum number of retreating edges in any acyclic path in the flow graph associated with the candidate Depth First Search Tree, and
selecting a candidate Depth First Search Tree associated with a minimum loop connectedness, from among the plurality of candidate Depth First Search Trees, as the Depth First Search Tree.

12. The non-transitory computer-readable storage medium of claim 11, wherein the method further comprises:
outputting the partitioned graph and associated metadata without scheduling the computations and the communications in response determining that the partitioned graph is not an irreducible graph.

13. The network device of claim 1, wherein the processing circuitry is configured to cause the network device to determine whether the partitioned graph can be reduced to a single node by removing all self-loops in the partitioned graph and merging each pair of nodes of the partitioned graph to a single node if a first node of the pair of nodes is a predecessor to a second node of the pair of nodes.

* * * * *